United States Patent
MacLean et al.

(10) Patent No.: US 10,007,496 B2
(45) Date of Patent: Jun. 26, 2018

(54) DATA FLOW GRAPH

(71) Applicant: Raptor Oil Limited, Aberdeen (GB)

(72) Inventors: Colin MacLean, Aberdeen (GB); Gordon Cowie, Aberdeen (GB)

(73) Assignee: Raptor Oil Limited, Aberdeen (GB)

( * ) Notice: Subject to any disclaimer, the term of this patent is extended or adjusted under 35 U.S.C. 154(b) by 124 days.

(21) Appl. No.: 15/014,630

(22) Filed: Feb. 3, 2016

(65) Prior Publication Data
US 2016/0239276 A1 Aug. 18, 2016

(30) Foreign Application Priority Data

Feb. 13, 2015 (GB) .................................. 1502494.6

(51) Int. Cl.
G06F 9/44 (2018.01)
G06F 8/41 (2018.01)
G06F 9/448 (2018.01)

(52) U.S. Cl.
CPC .............. G06F 8/433 (2013.01); G06F 8/443 (2013.01); G06F 9/4494 (2018.02)

(58) Field of Classification Search
CPC ........ G06F 8/433; G06F 8/443; G06F 9/4436; G06F 9/4494
USPC .................. 717/110–113, 154–157
See application file for complete search history.

(56) References Cited

U.S. PATENT DOCUMENTS

| | | |
|---|---|---|
| 4,972,314 A | 11/1990 | Getzinger et al. |
| 5,021,947 A | 6/1991 | Campbell et al. |
| 2004/0073529 A1 | 4/2004 | Stanfill |
| 2006/0101368 A1* | 5/2006 | Kesarwani .......... G06F 17/5045 716/137 |
| 2007/0011668 A1* | 1/2007 | Wholey .................... G06F 8/34 717/151 |
| 2011/0307897 A1 | 12/2011 | Atterbury et al. |
| 2013/0097592 A1* | 4/2013 | Simitsis ............. G06Q 10/0633 717/156 |
| 2014/0040855 A1 | 2/2014 | Wang et al. |
| 2014/0068560 A1 | 3/2014 | Eksten et al. |

FOREIGN PATENT DOCUMENTS

WO    WO-0211344 A2    2/2002

OTHER PUBLICATIONS

Scott Mitchell, "An Extensive Examination of Data StructuresUsing C# 2.0", Jan. 2005, retrieved from, https://msdn.microsoft.com/enus/library/ms379574.aspx, Part 5: From Trees to Graphs, 19 pages.*

(Continued)

*Primary Examiner* — Ted T Vo
(74) *Attorney, Agent, or Firm* — Winstead PC

(57) ABSTRACT

To provide dynamic data flow programming for digital signal processing, data flow graphs are constructed from graph libraries. The libraries provide redirection to relevant setup functions so that nodes of a graph table can be instantiated and associated memory can be allocated in dynamic working memory. The nodes of the graph table are modular and should conditions change, the data flow graph can be dynamically altered to change the parameters applied to these nodes thereby altering their functionality and adjusting the behavior of the data flow programming in accordance with the prevailing conditions.

20 Claims, 9 Drawing Sheets

(56) References Cited

OTHER PUBLICATIONS

Wang, Lai-Huei, et al.; "Dataflow Modeling and Design for Cognitive Radio Networks"; In Proceedings of the International Conference on Cognitive Radio Oriented Wireless Networks, Washington, D.C.; Jul. 2013; 6 pages.

Jhon, Chu S., et al.; "Deadlock Analysis in the Design of Data-Flow Circuits"; Paper 47.3, 21st Design Automation Conference; Jun. 1984; pp. 705-707.

Lee, Edward Ashford, et al.; "Static Scheduling of Synchronous Data Flow Programs for Digital Signal Processing"; IEEE Transactions on Computers, vol. C-36, No. 1; Jan. 1987; pp. 24-35.

Drumheller, Douglas S.; "Wave Impedances of Drill Strings and other Periodic Media"; J. Acoust. Soc. Am., vol. 112, No. 6; Dec. 2002; pp. 2527-2539.

Fayez, Almohanad S., "Design Space Decomposition for Cognitive and Software Defined Radios," Dissertation submitted to the Faculty of the Virginia Polytechnic Institute and State University, May 29, 2013, 118 pages.

\* cited by examiner

| Name | Value | Type |
|---|---|---|
| nodeTable | 0x00021084 | struct node[100] |
| [0] | {...} | dfc_node |
| ✦ fPtr | 0x00002128 | function * |
| ✦ DataInput | 0x00000000 | void * |
| ✦ DataOutput | 0x807FF8E8 | void * |
| ✦ PersistantVars | 0x807FFE38 | void * |
| nType | ADC {23} | enum node_type |
| ✦ ParentNode | 0x00000000 | struct node * |
| ▬ ChildNode | 0x00021DA4 | struct node * |
| ✦ fPtr | 0x000016C4 | function * |
| ✦ DataInput | 0x00000000 | void * |
| ✦ DataOutput | 0x00000000 | void * |
| ✦ PersistantVars | 0x807FFA68 | void * |
| nType | DECQUE {14} | enum node_type |
| ✦ ParentNode | 0x00021D84 | struct node * |
| ▬ ChildNode | 0x00021DC4 | struct node * |
| ✦ fPtr | 0x00000C38 | function * |
| ✦ DataInput | 0x807FDBD8 | void * |
| ✦ DataOutput | 0x00000000 | void * |
| ✦ PersistantVars | 0x807FF6E8 | void * |
| nType | CORREL {3} | enum node_type |
| ✦ ParentNode | 0x00021DA4 | struct node * |
| ▬ ChildNode | 0x00021E04 | struct node * |
| ✦ fPtr | 0x000016C4 | function * |
| ✦ DataInput | 0x00000000 | void * |
| ✦ DataOutput | 0x00000000 | void * |

FIG. 8

Node Table

Entry 1:
- Pointer to Node Executable
- Pointer to Data Input
- Pointer to Data Output
- Pointer to Persistent Variables
- Node Type ID
- Pointer to Parent Node
- Pointer to Child Node
- Graph ID Entry 2:
- Pointer to Node Executable
- Pointer to Data Input

FIG. 7

DATA FLOW GRAPH

BACKGROUND OF THE INVENTION

The present invention relates generally to data flow graph schemas. More specifically, the present invention relates to data flow graphs suitable for use in communication systems, such as downhole wireless communication systems.

Developed in the 1960's, data flow graphs (DFG) were used specifically to provide flexible, easy to program, interfaces for Digital Signal Processing (DSP) algorithms. Synchronous data flow graph (SDFG) schemas have been deployed for their flexibility and robustness in many different situations (for example, in chemical and nuclear plants, in aircraft flight control systems, cognitive radio and in spacecraft).

A typical SDFG consists of nodes or "actors" (corresponding to functional blocks) and connecting arcs or "edges" (indicating the passage of data "samples" from a first node to the next). SDFGs are typically directed graphs (the paths between nodes/actors are unidirectional). Each node receiving samples from one or more preceding nodes is "fired" or executes once they have input data available to process (e.g. when the number of samples received reaches a threshold level). The nodes deployed, the threshold levels and the arcs taken between nodes may each be considered "parameters" of the SDFG schema.

SDFGs support multiple arcs leaving or arriving at each node but this can lead to the problem of data deadlock (when two or more competing actions are waiting for the other to finish, and thus neither does). Consequently, graphs having multiple arcs may need to be re-parameterized and checked for deadlock.

Certain known SDFG schemas allow the parameters used to be altered and changed. These schemas, however, are typically hierarchical; groups of nodes and connecting arcs being clustered and considered as a single "supernode" for the purposes of a higher level in the hierarchy. Hierarchy is adopted to allow parallel execution of nodes. Where nodes (or supernodes) are executed in parallel, there arises a need to temporarily store output in asynchronous buffers. Parallelism and asynchronous buffering means these schemas also require deadlock checks. Furthermore, they do not provide for the safe destruction and rebuilding of parameters associated with the graph.

Further variations on the SDFG incorporate control arcs that aim to add the flexibility of procedural code to the model. Incorporation of control arcs (and subgraphs) adds considerable additional complexity, undermining the simplicity and efficiency of SDFGs.

Downhole conditions are hostile with unstable, difficult communication conditions and high temperatures. The high temperature environment, such as a deep well, restricts hardware computational resources to low speed processors with small amounts of on-board memory. Unstable communication channels (whether electromagnetic, acoustic or wired) or the need to prioritize data processing leads to the requirement for flexibility in managing resources as conditions change. There are therefore two key requirements for downhole communications and data processing; they are resource management and the dynamic instantiation of optimal data processing elements.

There is furthermore a need for functionality that can instantiate simple and efficient SDFGs 'on the fly' at run time, in a form where they can be safely built and destroyed.

SUMMARY OF THE INVENTION

According to one aspect of the present disclosure, there is provided a method for executing a dynamically adjustable data flow graph for digital signal processing, the method comprising:

calling a graph setup routine for the data flow graph;

executing the retrieved routine with a first set of parameter values, thereby instantiating the data flow graph; and when the graph set up routine is complete, calling a graph execution routine for the data flow graph wherein executing the retrieved routine includes: building a node table corresponding to the data flow graph, the node table having one or more nodes and including arc information associated with each of said nodes; and allocating memory, and wherein the arc information defines a respective single arc joining any two nodes in the node table.

In certain embodiments, the operation of calling the graph setup routine may include retrieving the graph setup routine directly from conventional procedural code by pointer reference. Alternatively, the operation of calling the graph setup routine may include retrieving the graph setup routine from a corresponding address within a graph library.

The graph library may include one or more graph object entries, each entry having a respective address within the graph library and corresponding to a respective graph set up routine;

The at least one of the one or more nodes in the node table may be a buffer node. Executing the retrieved routine may further include initializing the memory with variables in accordance with the first set of parameter values.

Each node may have an input buffer for storing input data. Each node may require a corresponding minimum amount of input data before it can execute. Each node may not execute unless the amount of input data exceeds a threshold, said threshold being greater than or equal to the minimum amount of data. The graph execution routine may execute a first node in the graph by default. When an input buffer associated with a given node contains sufficient data graph the execution routine may call an executable function corresponding to the given node.

The method may further comprise updating the data flow graph by executing a graph rebuild routine for the data flow graph with a second set of parameter values, thereby re-parameterizing the data flow graph; and running the re-parameterized graph using the graph execution routine.

The graph rebuild routine "destroys" the contents of the memory allocated to the graph and then executes the graph set up routine for the data flow graph using the second set of parameter values. In certain embodiments, the contents in allocated memory are destroyed by deleting the memory allocation and the graph's nodes from the node table.

Alternatively or additionally, the method may further comprise deactivating the data flow graph by executing a graph deletion routine for the data flow graph, graph deletion comprising deleting the entries corresponding to each node in the node table, deleting the memory allocations corresponding to the nodes; and then deleting the graph entry from the node table.

The graph execution routine, pump( ) function, can be run in a thread and thus multiple graphs can be independently run, for example in the case of simultaneous transmission and reception of data the receiver and transmitter programs can be implemented using separate graphs running on different threads.

As a result of the method, DFGs constructed in accordance with the present disclosure do not require compilers and can be instantiated by simple loader functions which are encapsulated within a graph library. This is achieved by simplifying the construction of a DFG to avoid data deadlock, building libraries of standard DFG templates for the application, holding all memory allocated to the DFG by reference, thus enabling it to be safely destroyed and/or re-parameterized in a stable fashion.

Embodiments of the present disclosure specifically support multi-threading of DFGs, as well as the synchronisation of sampling systems with asynchronous data flow. Moreover, the method enables the safe deletion of DFG's and their resources without the leakage or corruption of dynamically allocated memory.

The present disclosure further simplifies synchronous DFG schemas by only allowing a single arc between nodes in a table. This restriction does not however limit the DFG schemas to be supported. In cases where multiple streams are required, i.e. an orthogonal frequency division multiplexing (OFDM) modem, splitter nodes can be used to generate parallel, unconnected paths which again are immune to deadlock.

The present disclosure therefore addresses problems of instantiation and execution of programs in a safe and reliable fashion on limited resource platforms. Programs can be deployed, run, re-parameterized and destroyed dynamically. This is done in such a way as to be thread safe, memory safe and stable whilst providing the flexibility of conventional programming models.

In a further aspect of the present disclosure there is provided a processing device for executing a digital signal processing algorithm, the processing device including a processor configured to: call a graph set up routine for a dynamically adjustable data flow graph; execute the retrieved routine with a first set of parameter values, thereby instantiating the data flow graph; and, when the graph set up routine is complete, call a graph execution routine for the data flow graph, wherein the processor is configured to execute the retrieved routine by: building a node table corresponding to the data flow graph, the node table having one or more nodes and including arc information associated with each of said nodes; and allocating memory, and wherein the arc information defines a respective single arc joining any two nodes in the node table.

The processor is further configured to retrieve the graph setup routine directly from conventional procedural code by pointer reference. Alternatively, the signal processing device further includes a memory which stores a graph library, the processor may then be further configured to retrieve the graph setup routine from a corresponding address within the graph library.

Examples of such signal processing devices include general processing units (GPU), FPGA, SoC and/or ASICs.

Various further aspects and embodiments of the present disclosure are provided in the accompanying independent and dependent claims.

It will be appreciated that features and aspects of the present disclosure described above in relation to the first and other aspects of the invention are equally applicable to, and may be combined with, embodiments of the invention according to the different aspects of the invention as appropriate, and not just in the specific combinations described above. Furthermore features of the dependent claims may be combined with features of the independent claims in combinations other than those explicitly set out in the claims.

BRIEF DESCRIPTION OF THE DRAWINGS

Embodiments of the present disclosure will now be described by way of example only with reference to the accompanying drawings, where like parts are provided with corresponding reference numerals and in which:

FIG. 7 illustrates a typical node table structure in accordance with an embodiment of the present disclosure;

FIG. 8 illustrates an extended node table structure in accordance with a further embodiment of the present disclosure;

DETAILED DESCRIPTION OF PREFERRED EMBODIMENTS

Figure 1:
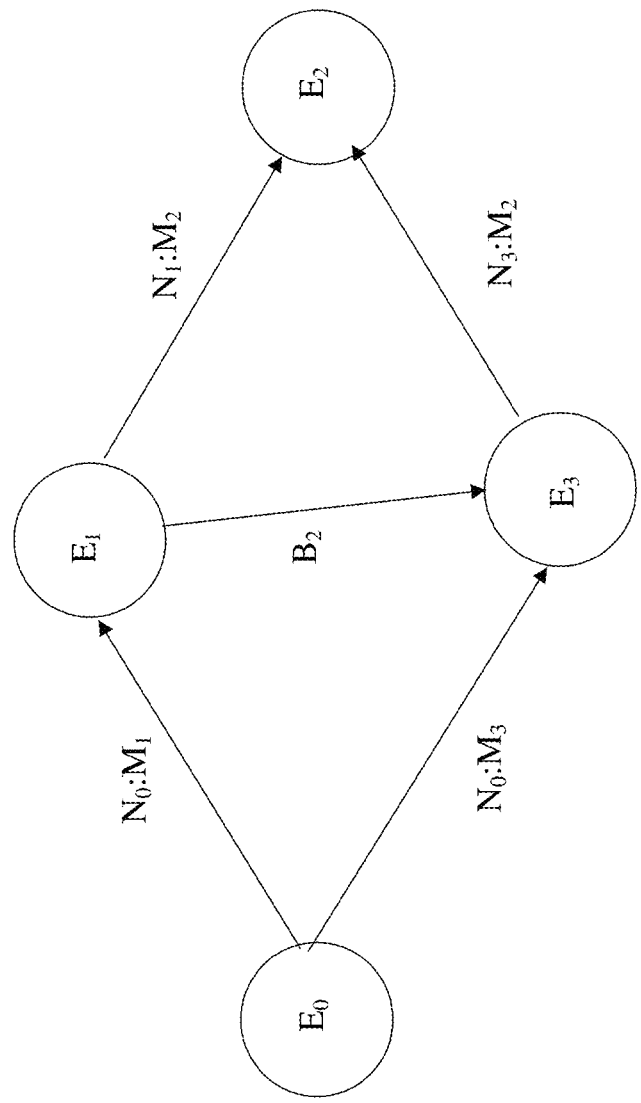
FIG. 1 shows a simple data flow graph.

The detailed description set forth below in connection with the appended drawings is intended as a description of presently preferred embodiments of the disclosure, and is not intended to represent the only forms in which the present disclosure may be practised. It is to be understood that the same or equivalent functions may be accomplished by different embodiments that are intended to be encompassed within the spirit and scope of the invention. In the drawings, like numerals are used to indicate like elements throughout. Furthermore, terms such as "comprises", "comprising", "contains" or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

Exploring for and exploiting underground resources (such as underground oil, gas, shale, hydrothermal or artesian resources) has become increasingly sophisticated. Much of the exploration is carried out by equipment delivered to the exploration site by means of drilling. Any portion of the drilling operation below the site of a wellhead is referred to as "downhole". New technologies such as high-temperature sensor technology and downhole navigation increase the demand for reliable and effective communication downhole as well as between transceivers above the wellbore and those below.

Communications can be very challenging to implement at the exploration site as they are typically remote (often offshore and hundreds or thousands of meters below sea level) and the downhole environment can vary a great deal in terms of the surrounding geological features and the thermal and mechanical properties of the materials present in an established well (such as the pipework (e.g. drill string, riser, etc.) and production tubing, lining, mud, hydrocarbons, lubricants and seawater).

Wireless communication using electromagnetic waves, such as radio frequency EM waves, is well known, as is short range optical frequency EM waves communications. For "in-well" communications, the medium is often solid— for instance, a drill string or a riser—so other communications techniques are adopted. Both EM communications technologies suffer disadvantages in providing in-well and underwater communications. For in-well and many underwater applications, it is more usual to adopt acoustic telemetry, mud pulse telemetry (using pressure pulses that propagate up the column of drilling fluid inside the drill string) and/or other ultrasonic technologies.

In acoustic telemetry, for instance, an encoded sound wave (a stress wave) is generated by a suitable transceiver. Typically the sound wave then propagates along the pipework and/or production tubing. A receiver then extracts the data from the signal. The transceiver is typically located downhole, while the receiver is placed at or near the well head, at the surface.

The drill string may be considered as a series of (steel) pipes of uniform length connected by short couplings having different physical properties, can effectively limit effective communications to a number of passbands. The issue is discussed in greater detail in an article by Drumheller, "Wave impedances of drill strings and other periodic media" [2].

As a borehole is extended and/or becomes operational, the environment becomes dynamic. The passbands themselves fade or drift over time.

To the author's knowledge, synchronous data flow graph (SDFG) schemas have not been applied to the demanding conditions of downhole communications. Data flow graph schemas offer some of the functionality necessary to address the need for resource management and dynamic instantiation of optimal data processing elements occasioned by unstable communication channels and/or the need to prioritize data processing in downhole implementations. DFGs were considered as they are known to provide flexible, easy to program, interfaces for Digital Signal Processing (DSP) algorithms. Messerschmitt and Lee, in their paper "Static Scheduling of Synchronous Data Flow Programs for Digital Signal Processing" [1], provide a detailed introduction to Statically Scheduled Data Flow Graphs. They give the theoretical basis for effective scheduling of the processing represented by each node of a DFG in single or multi-processor scenarios.

A typical synchronous data flow graph consists of nodes and connecting arcs, as illustrated in FIG. 1. FIG. 1 illustrates a simple, exemplary, data flow graph in which each node: $E_0$, $E_1$, $E_2$ and $E_3$ represents a functional block. Nodes are connected together by arcs that receive N samples from the parent node from which the child node "consumes" [i.e. processes and marks as processed] M samples: note that N and M are not generally the same value. Each node "fires" [i.e. executes] and generates N samples on each arc. For example: node $E_1$ fires when it has $M_1$ samples from node $E_0$. Nodes can only fire when there is sufficient data available on their input arcs, i.e. a sample threshold. In certain cases, each input to a functional block also has an associated threshold that specifies the number of data samples requires to trigger the node to fire (this may of course be different from the amount of data considered "sufficient").

Synchronous DFGs (SDFG) are typically compiled using graphical toolsets. These toolsets statically build nodes, add parameters and connect them together. The fact that SDFGs support multiple arcs leaving or arriving at each node can lead to the problem of data deadlock: for example, FIG. 1 shows node $E_1$ with a single input arc and two output arcs—to nodes node $E_2$ and $E_3$ respectively. This requires the graph to be re-parameterized and checked for deadlock.

Figure 2:
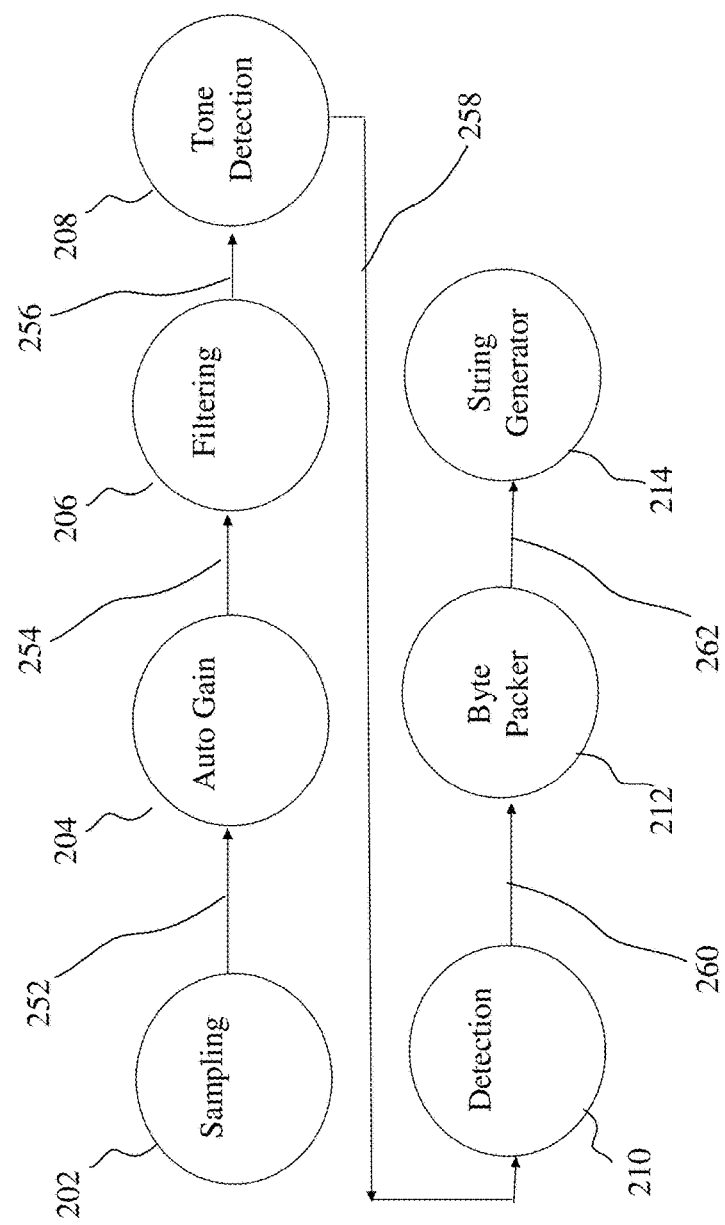
FIG. 2 shows a data flow graph illustrating the use of a data flow graph in digital signal processing.

FIG. 2 illustrates the use of a DFG in digital signal processing. Thus in node 202, an input data stream is sampled. An arc 252 connects the sampling node 202 to an auto gain node 204. A further arc 254 connects the auto gain node 204 to a filtering node 206. Arc 256 connects the filtering node 206 to a tone detection node 208. Arc 258 connects tone detection node 208 to a detection node 210. Arc 260 connects the detection node 210 to a byte packer node 212. Arc 262 connects the byte packer node 212 to a string generator node 214.

FIG. 2 thus shows a conventional data flow diagram for a typical data communications modem. In particular, the Figure shows a Frequency Shift Keyed (FSK) modem, where signals are transmitted at one of two frequencies at any one time: the first frequency representing the binary digit '0' and the second, binary '1'. These bit streams are used to construct string or data arrays that are decoded in the above structure. Note that the arc weightings are removed for clarity in FIG. 2.

If the communications channel were to change in some measurable way the static nature of SDFGs can be exposed, as they cannot be easily reconfigured to adapt to change without sacrificing efficiency. For example, the noise in the channel may reduce or the attenuation may change thus providing an increase in usable bandwidth. Alternatively, as noted above in the case of acoustic telemetry, the frequency of a "passband" (where communication is considered more effective) may vary over time. Using a SDFG alone makes adapting to the improved or changed communications conditions difficult. This is especially apparent where the only practical mechanism for altering the graph is the aforementioned graphical toolset compilation technique.

As noted previously, the conditions for wireless communications (using, for example, radio, optical, acoustic and/or ultrasonic technologies) in the downhole environment are typically hostile. Part of the hostility is the presence of dynamically changing conditions.

An alternative approach to the use of synchronous data flow graphs is therefore considered.

Figure 3:
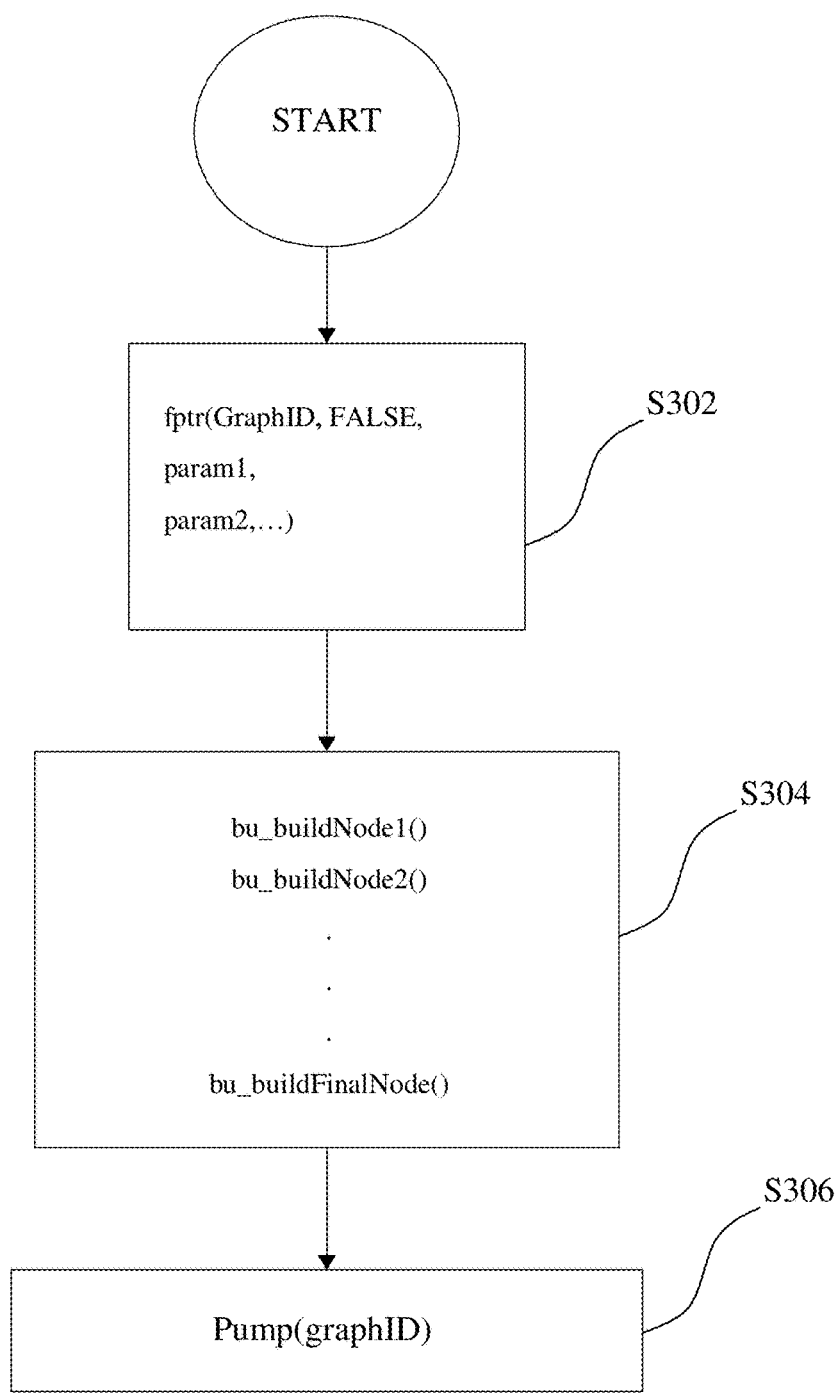
FIG. 3 is a flow diagram illustrating the construction of a data flow graph in accordance with an embodiment of the present disclosure.

FIG. 3 illustrates the construction of a data flow graph in accordance with an embodiment of the present disclosure.

A graph library is provided. The library comprises a number of entries. Each entry in the library includes a unique identifier (i.e. graph ID) of a respective graph and a pointer (fptr) to the setup routine corresponding to the identified graph. In addition, the library entry will typically include a pointer to a parameter array, whereby the values of parameters may be stored in an allocated memory area.

In this embodiment, a DFG is instantiated by calling a corresponding entry in the graph library—operation S302: in alternative embodiments, instantiation may be achieved by directly invoking the relevant graph builder function. Calling the entry/function retrieves information that identifies the graph and locates the set up routine for the graph. In certain cases, the call also retrieves the location of relevant parameter values for use by the graph. The graph setup routine builds the graph nodes in the node table and allocates dynamic working memory, initializing it with variables if required—operation S304. Single arcs with buffer nodes may be part of the structure, as is discussed below in relation to FIG. 9. The setup routine returns a Graph ID.

The graph is executed using an execution routine referred to as the "pump function", which can be safely run in a thread—operation S306. The pump(GraphID) function runs the first node in the graph, GraphID. The first node can always be run in the present embodiment. Pump( ) fires each node in turn when that node's input buffer node ("deque") contains enough data (also known as "tokens") to fire the node. In computer science literature, a deque is an abstract data type which provides a double ended queue where data may be added to either the head or the tail of the queue. When a node is ready to fire, pump( ) calls the node's executable function. The pump( ) function can be run in a thread and thus multiple graphs can be independently run, for example in the case of simultaneous transmission and reception of data the receiver and transmitter programs can be implemented using separate graphs running on different threads.

Each node in the graph may have an associated input buffer, as discussed above: alternatively or additionally, each arc from node to node may include an independent buffer node, for which an independent build command is executed within the graph setup routine. The buffer node serves as the deque, thereby determining whether or not the next node is triggered.

To re-parameterize the DFG, a control layer (described elsewhere within the document) destroys all the parameter memory allocated to the graph and then accesses the setup function in the DFG's entry in the graph library in order to re-parameterize it.

Graphs are destroyed by calling the graph's destroy function which deletes the memory allocation and the graph's nodes from the node table.

Embodiments of the present disclosure allow the instantiation and re-parameterization of a graph from one or more libraries, requiring no additional compilation or data flow analysis. The design provides thread and memory safe solutions.

These embodiments have the flexibility of conventional programming models, such as object orientated programming (OOP).

Control layers may be built over certain embodiments allowing re-parameterization and control of the DFG without the need for additional node types (such as "snooper" nodes) or control/parameter arcs. An example of this approach is discussed in the dissertation by Fayez "Design Space Decomposition for Cognitive and Software Defined Radios" [3].

Embodiments of the present disclosure deliver:
Dynamic re-parameterization
Strict dynamic memory control during the construction and destruction of graphs.
Portable 'C' Library based implementation.
Non-OOP implementation for greater speed and memory efficiencies.

The present disclosure centers upon six elements, each of which is described in detail in the following sections in the order in which they are used in the implementation.

Graph Library
Node Table
Builders
Alloc Table
Data Pump
Graphs

Figure 4:
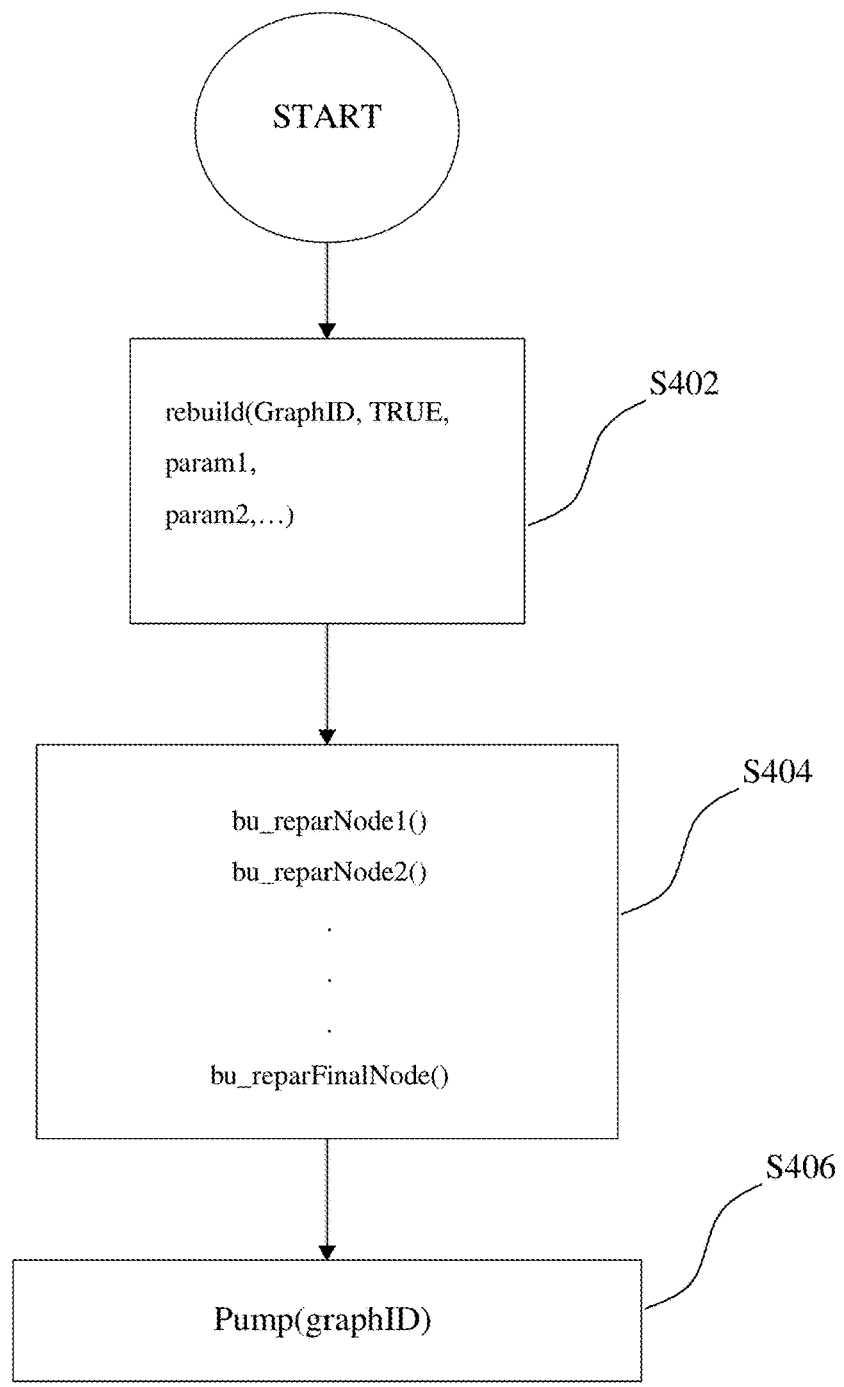
FIG. 4 is a flow diagram illustrating the re-parameterization of a data flow graph in accordance with an embodiment of the present disclosure.
Figure 5:
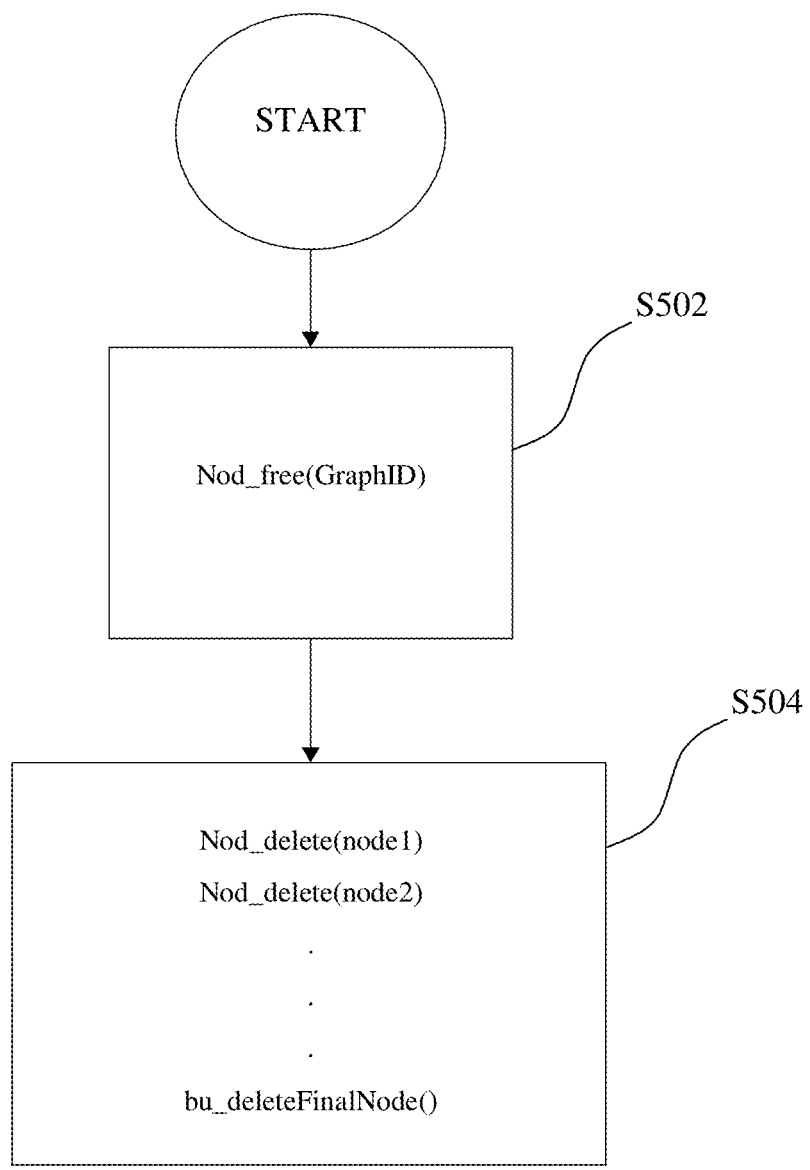
FIG. 5 is a flow diagram illustrating the deletion of a data flow graph in accordance with an embodiment of the present disclosure.

The processes for building, parameterization and deleting graphs is described in the flow diagrams shown in FIGS. 3 to 5.

FIG. 3 is a flow diagram illustrating certain steps in the code flow of the construction of a data flow graph in accordance with an embodiment of the present disclosure. The graph setup function is called via a pointer in the Graph Library Table. The Setup function builds the nodes, allocates memory and initializes all parameters and memory arrays. A pointer to the GraphID is returned. The re-parameterize variable is set to FALSE to instantiate the graph.

FIG. 4 is a flow diagram illustrating the re-parameterization of a data flow graph in accordance with an embodiment of the present disclosure. It shows certain steps in the re-parameterization of an instantiated graph. As in FIG. 3, the setup routine calls sets the re-parameterize value—on this occasion however this value is set to TRUE—operation S402. This routine is named Rebuild( ) in this flow diagram. Rebuild( ) frees all of a graph's memory allocation from the memory table. It calls the Graph's builder routine in the Graph table passing new parameters to be instantiated. The node structure is unaltered.

Each builder function has a version that only re-parameterizes nodes. These functions are denoted by the preface bu_repar. If the graph's Setup routine had been called with reparam=FALSE then the function would have had to call node_delete_params(GraphID) in order to free all memory allocated to the graph—operation S404. As in the case of instantiation, the newly re-parameterized graph is then executed using the pump function—operation S406.

Returning to the example of digital signal processing, illustrated in FIG. 2, in comparison to SDFG, the application of the present disclosure to digital signal processing makes it possible to change a graph dynamically so that rather than having to use FSK, certain nodes can be re-parameterized to provide "higher order" modulation techniques such as quadrature phase shift keying (QPSK) or QAM (which is used in Orthogonal Frequency Division multiplexing, OFDM), thus taking advantage of the greater signal bandwidth.

FIG. 5 is a flow diagram illustrating the deletion of a data flow graph in accordance with an embodiment of the present disclosure. It shows certain steps required to delete a graph. Nod_freeGraph( ) frees all memory allocated to the graph—operation S502—and Nod_delete(node_n) removes node n's node entries from the Node Table—operation S504.

Graph Library

The Graph Library contains functions to build, destroy and re-parameterize DFG's.

Figure 6:
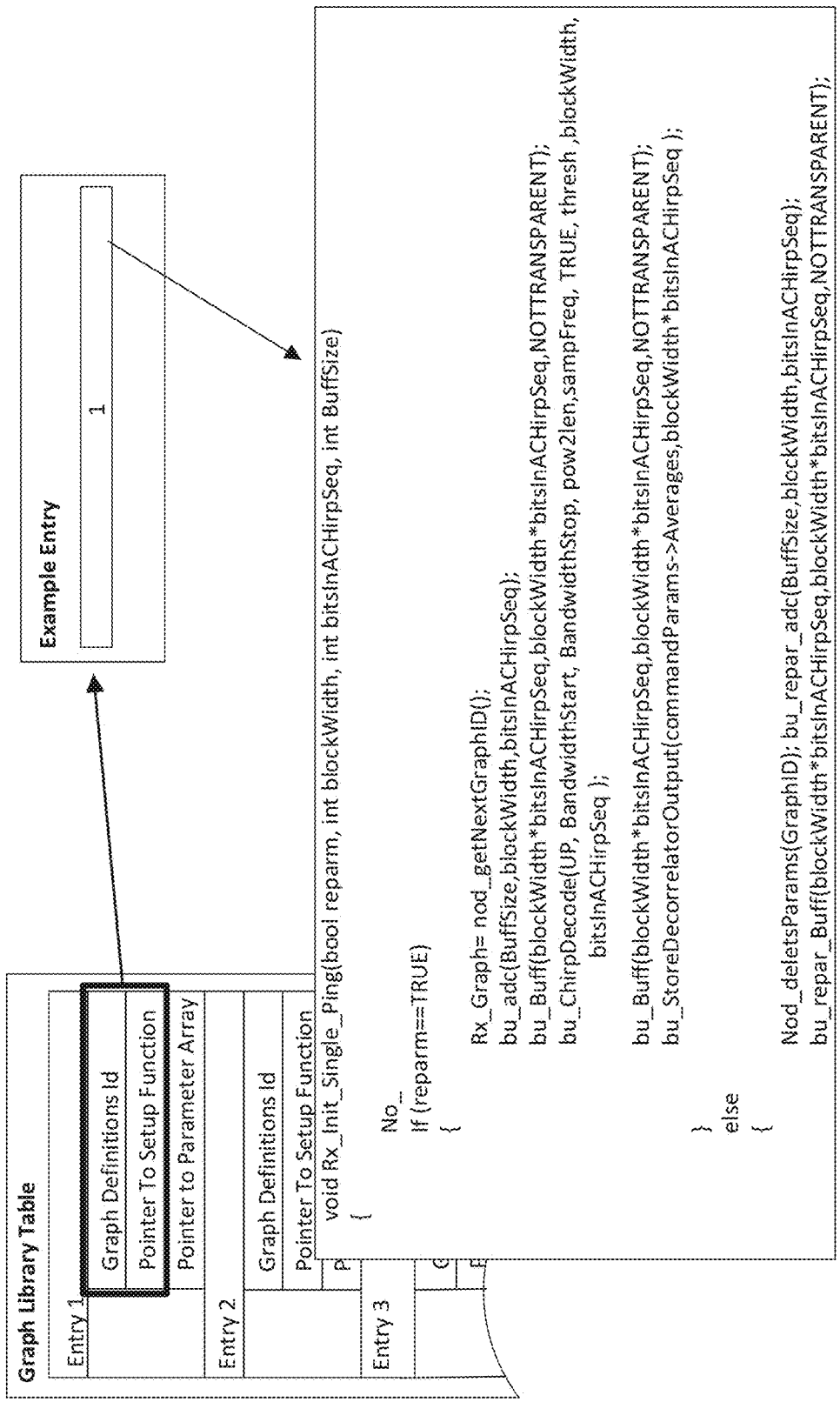
FIG. 6 illustrates a typical graph table structure in accordance with an embodiment of the present disclosure.

The library can be called from control code structures such as Finite State Machines running on a separate thread. FIG. 6 illustrates a typical graph table structure in accordance with an embodiment of the present disclosure. This Figure shows the operation and use of the library as well as its structures. The main element of the Graph Library is the library table. This is a statically compiled array of Graph Definitions. Each table entry holds a unique ID for each entry (in certain embodiments, external functions access this entry via means of a hash table).
a pointer to the setup function that instantiates or re-parameterizes the graph.
a pointer to a set of parameters For example to build a Single Chirp Decode graph requires a call to its entry in the GraphLibrary table to be called like this:

FunctPtr(GraphIDPtr,FALSE,11,8,50)

Where FuncPtr is a pointer to the correct function entry in the Graph Library Table, GraphIDPtr, is a pointer to allow the function to write the ID for the graph back to the calling function. The reparams variable is set to FALSE to tell the setup function for this graph that this is not a re-parameterization call and therefore the Graph and parameters must be instantiated. The remaining parameters in the call list represent the parameters required to build the graph. The setup function pointers are stored in the Library table statically; they point to functions stored in a local code module.

Each setup function can build and/or re-parameterize a graph. FIG. 6 contains a code example for a typical setup program such that it calls the correct node builders to build the graph and generates an entry in the Graph Table (do not confuse this with the Graph Library Table).

Node Table

The node table is an array of structures that contains entries for all the nodes contained in all the graphs that are currently instantiated. FIGS. 7 and 8 show the structure of typical node tables and a typical example respectively. In the latter Figure, the Table is expanded to show the parent-child relationship. The Setup functions, described above, instantiate the nodes and load them into the node table. For example, a node for performing a Butterworth filter using certain initial values would be called using syntax, such as:

Bu_Filt(BUTTERWORTH,0.15,0.25,2,10)

This function would build a filter node for the graph in FIG. 2, where the filter would be of type BUTTERWORTH, passband 0.15 to 0.25 of sampling frequency, with a 2% ripple and a transition band of 10%.

Each node structure in FIGS. 7 and 8 contains a pointer to an executable function (buffer nodes excepted). The Nodes are built by the specific builder function for each node type.

The DataInput and DataOutput pointers are used to hook into buffer nodes for data transfers between functional nodes. Each node has parent and child node pointers. The root node of a graph has a null parent and the last node has a null child. Finally, all nodes have a persistent variables pointer. This pointer references a structure containing a set of parameters required for the node function. Thus we can have multiple nodes of the same type but with different parameters. This structure leads to the requirement that node functions should not contain any static variables that could be shared through multiple instances of the same node type. Each node types parameter structure is declared in the builder.h file and has memory allocated for it by its builder function. All memory is dynamically allocated on the heap but each node structure contains a graphID field.

Builders and Re-Parameterizers

Each node requires at least one builder function and at least one re-parameterization function. The builder functions can be viewed as constructors that build specific node types but inherit their structure from the node object. All builders have to carry out specific tasks.

The builder function is to get a node for itself and to initialize its parameter fields, most importantly, it has to initialize the PerisistantVars pointer and the structure that it points to. This structure contains working memory for the node and also any static parameters passed to it or obtained as the result of being passed to the builder function. In the above code the builder function declares a node pointer and a pointer to the specific PerisistantVars structure. The function creates a new dfc_node and marks it as a link node so that it hooks into the current graph. After setting the node type field nod_malloc is called to allocate heap memory for the node's parameter block. The node structure is also initialized with a pointer to the nodes executable function. So these are the generic elements of any builder function:

Get a dfc_node reference.
Allocate memory from the heap for the nodes working memory.
Initialize any parameters that are required.
Set the node type.
Point the node at its executable function.

The re-parameterize functions are similar but re-parameterize an existing node.

Alloc Tables

Nodes require dynamically allocated memory which is taken from the heap using the system call malloc and calloc. However, it is a design requirement that each graph can be deleted such that all of its dynamic memory is freed immediately. The allocTable table contains a record of all memory allocated by the graph id and Node pointer.

Each structure points to the node that it refers to and that node's GraphID. Also stored is the memory pointer returned by malloc( ) so that free( ) can be used to release the memory back to the heap when the node is deleted. The number of bytes allocated is also stored in order to aid debugging if the system runs out of heap memory. This approach removes the possibility of memory leaks.

Pump

The Pump( ) function provides the mechanism for executing a graph. The function is called using the following syntax:

Pump(GraphID)

The function then accesses the node table to find the first node in the graph and calls its executable function (in the SDFG implementation the first node can always fire). Following the firing of a node, its child buffer node is checked to see if there is sufficient data to fire its child node. If that node can fire then Pump( ) fires it and continues. Otherwise Pump( ) checks to see if the current node can fire and if not it continues down the parent nodes until it finds one that can or reaches the first node which can always fire. Special nodes such as sampling nodes can wait for data to be provided via hardware resources.

As deadlocks are avoided DFGs can in principle run forever, however nodes can be programmed to set the Pump function's 'kill' variable allowing the DGF to terminate.

Graphs

Figure 9:
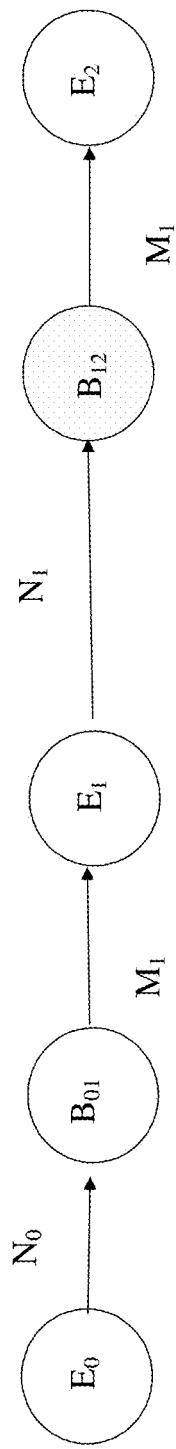
FIG. 9 illustrates an embodiment of the present disclosure in a single chain of nodes.

FIG. 9 illustrates another embodiment of the present disclosure. Note that it is a single chain design with only a single arc or edge joining each node. There are two reasons why this simple structure may be adopted. Firstly, all conventional and many proprietary communication algorithms can be supported within this structure. Secondly, multi-arc DFGs can suffer from data flow deadlock. This can be checked for on compilation but it does require a formal data flow compiler to be written. Additionally, in order to support dynamic parameterization of the graph, the control code would have to check against data deadlock every time the parameters changed. This is not deemed to be an efficient and practical implementation and as such is deprecated.

In FIG. 9, three functional nodes, $E_0$ through $E_2$ are connected together by two buffer nodes, $B_0$ & $B_1$, that act as arcs or edges of the graph. Buffer functional nodes are in fact the same object. Each buffer node takes N samples produced by the functional node on its left. M samples are then consumed by the node on its right. All graphs start and finish with a functional node and any consecutive pair of functional nodes are separated by a buffer node. As mentioned before buffer nodes are simply a special case of functional node with a null functional pointer.

Control Layer

While it is possible to just run (and delete) DFGs in accordance with the present disclosure without external control, a significant advantage of the present disclosure is that it is possible to add a control layer on top of the described DFG architecture. The control layer could be, but is not limited to, a simple (finite) state machine, an inference engine, Intelligent Agent or a probabilistic system. The control layer has a number of functions, namely: to respond to user requests to delete or change graphs and to monitor data entering or leaving a graph for analysis and then to re-parameterize or delete and build graphs. This mechanism facilitates the dynamic configuration of the system for changes in the communications channel, equalization of communications frequencies and control of the respective signal to noise ratios of each channel.

In one example, a modem of a signal processing apparatus using the DFGs of the present disclosure may instantiate a calibrated graph—run it—remove it and replace it with an optimized communications graph. If errors exceed a trigger level, the modem may start the process again, without interacting directly with the DFG.

In certain embodiments, the control layer is provided by an autonomous control system. This control system deletes and/or changes graphs based on information/data received from nodes corresponding to sensor/probe operations inside the DFG and/or external sensor data or some other predefined trigger mechanism. The autonomy is therefore a result of using knowledge extracted from the samples output by respective nodes in the graph, whether the approach to that data is supervised (i.e. configured to classify the output data on an a priori data classification) or unsupervised (i.e. drawing inferences from general principles such as data clustering). For example, the control system could use an "observe, decide, act and learn" mechanism whereby the control layer observes the current graph structure and the global environment (for instance, the transfer function of the communication channel, which may be monitored using a specially designed pulse) and, if the environment has changed sufficiently, decides which changes to make either by destroying the current graph or re-parameterizing the nodes (whilst maintaining the graph structure) in the current graph structure to take advantage of the new transfer function (the act phase). The system would also learn from the consequences of the applied action in the sense that observed results are then used to refine the decision phase.

Figure 10:
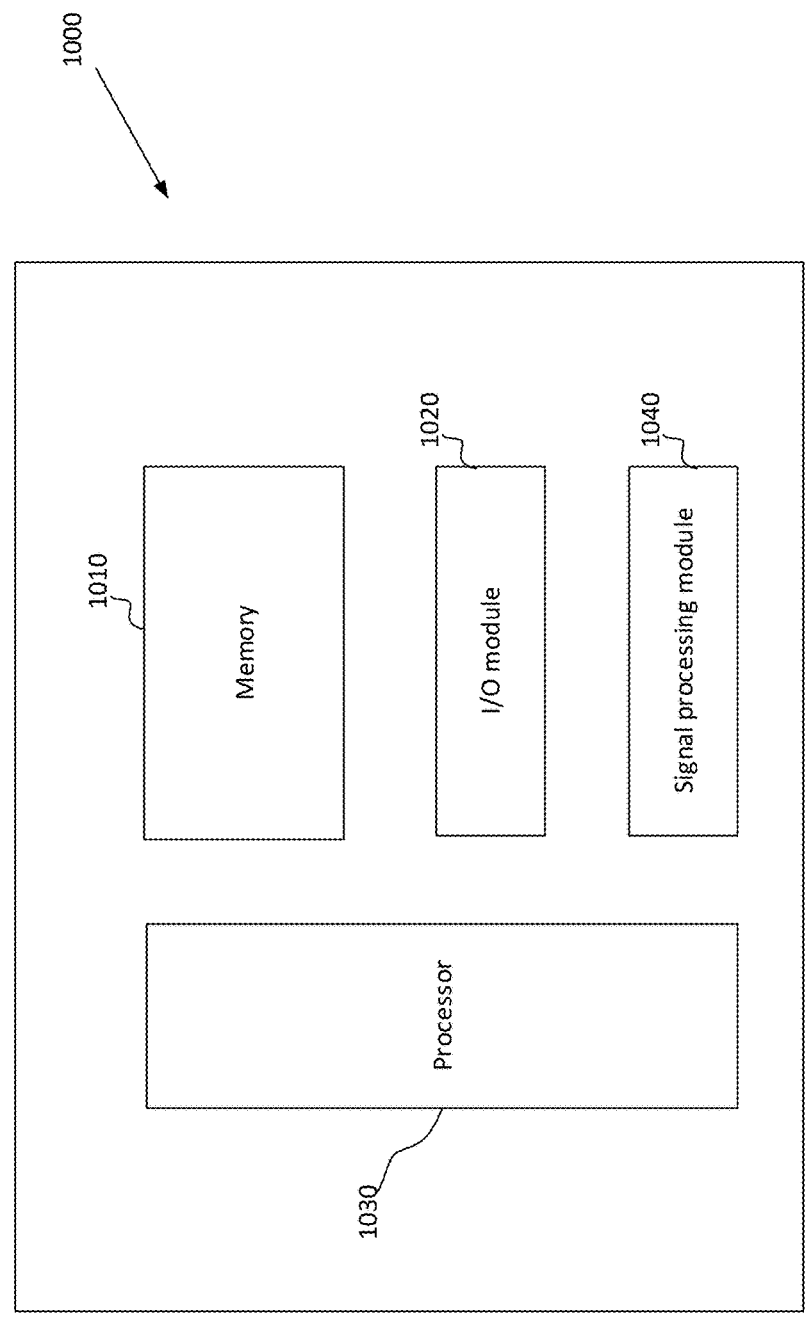
FIG. 10 schematically illustrates a signal processing device in accordance with an embodiment of the present disclosure.

The control layer can be implemented on a separate thread from the graphs which usually have a thread each. This may be the case with certain field programmable gate array (FPGA) and application specific integrated chip (ASIC) implementations. However, modern system on a chip (SoC) devices consist of a control and communications processor and one or more signal processing devices. The former can run the control layer. See FIG. 10.

The processor's common memory allows the control layer (in whatever form) to access all the structures that constitute a data flow graph. This enables the control layer processor or process to read (and/or monitor) the graph table to discover what graphs are active, monitor either end of the graph and determine when new data samples are produced or consumed and read these directly; in order to perform external analysis and decisions. No "snooper" nodes or control arcs (which are used in other graph types) are required in order to implement this process.

Certain embodiments ensure that control and data flow processes into and out of the DFG are either "node cyclic" or "anti-node cyclic" in character. In the node cyclic case, control and data flow processes occur only on the termination of a node's execution, i.e. its production of N samples of its child buffer. In the anti-node cyclic case, control and data flow processes occur only when it receives M samples from its parent buffer. Such events can occur at any time.

Consider the following examples:

Node Cyclic

Node cyclic events only occur when a node has fired and completed its execution. Examples would be the saving of data to local file or transfer to a cognitive/control layer for analysis. In this model internal buffers within the node can be monitored for analysis by a form of marker system. The control layer monitors known buffers and includes a mechanism for selecting or deselecting the known buffers for monitoring at will. The pump routine (to which all node functions eventually return) conveniently checks for marked memory areas and direct memory access, DMA, data into or out of them. Such events are data synchronous in character.

Anti-Node Cyclic

Anti node cyclic events are asynchronous events such as sending an ASCII telegram (into a DFG node) or posting a trace or error message from the DFG to the control layer.

In this case, the pump function cannot service the routine. Instead, the DFG is arranged to post an interrupt or message to the control layer; the interrupt/message can be parsed in accordance with a known message structure. This structure allows error messages to be saved to file, streamed to the LAN or used by the control layer etc.

These two methods provide the means for the DFG to be invisibly connected to its command and control superstructure with efficiency but also without the DFG requiring to know the structure of any layers above the interface.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims and their equivalents.

REFERENCES

[1] "Static Scheduling of Synchronous Data Flow Programs for Digital Signal Processing", Lee & Messerschmitt, IEEE Trans. On Computers, Vol. C-36, No. 1. January 1987

[2] "Wave impedances of drill strings and other periodic media", Drumheller. Douglas S, Journal of the Acoustical Society of America, Volume 112, Issue 6, pp. 2527-2539 (2002)

The invention claimed is:

1. A method for executing a dynamically adjustable data flow graph for digital signal processing, the method comprising, in a processor:

calling a graph setup routine for the data flow graph;

executing the called graph setup routine with a first set of parameter values, thereby instantiating the data flow graph, the instantiated data flow graph comprising a plurality of nodes connected by one or more arcs indicative of data passage between the plurality of nodes; and when the graph setup routine is complete, calling a graph execution routine for the data flow graph, wherein executing the called graph setup routine includes:
building a node table corresponding to the data flow graph, the node table comprising, for each node of the plurality of nodes:
a pointer to an executable function that is called when the node is executed; and
arc information associated with the node; and
allocating memory for each of the plurality of nodes; and wherein the node table, via the arc information of each of the plurality of nodes, defines a respective single arc of the one or more arcs joining any two nodes of the plurality of nodes.

2. The method as claimed in claim 1, wherein the operation of calling the graph setup routine includes retrieving the graph setup routine directly from conventional procedural code by pointer reference.

3. The method as claimed in claim 1, wherein the operation of calling the graph setup routine includes retrieving the graph setup routine from a corresponding address within a graph library.

4. The method as claimed in claim 3, wherein the graph library includes one or more graph object entries, each entry having a respective address within the graph library and corresponding to a respective graph setup routine.

5. The method as claimed in claim 1, wherein the node table defines at least one buffer node in addition to the plurality of nodes.

6. The method as claimed in claim 1, wherein executing the called graph setup routine further includes initializing the memory with variables in accordance with the first set of parameter values.

7. The method as claimed in claim 1, wherein calling the graph execution routine comprises executing a first node in the graph by default.

8. The method as claimed in claim 1, wherein each node has an input buffer for storing input data.

9. The method as claimed in claim 8, wherein each node requires a corresponding minimum amount of input data before it can execute.

10. The method as claimed in claim 9, wherein the graph execution routine calls the executable function corresponding to a given node of the plurality of nodes when the input buffer associated with the given node contains at least the minimum amount of input data.

11. The method as claimed in claim 9, wherein the graph execution routine calls the executable function corresponding to a given node of the plurality of nodes when the input buffer associated with the given node contains an amount of input data greater than or equal to a threshold, said threshold being greater than or equal to the minimum amount of input data.

12. The method as claimed in claim 1, further comprising:
updating the data flow graph by executing a graph rebuild routine for the data flow graph with a second set of parameter values, thereby re-parameterizing the data flow graph; and
running the re-parameterized data flow graph using the graph execution routine.

13. The method as claimed in claim 12, wherein the graph rebuild routine destroys the contents of the memory allocated to the data flow graph and then executes the graph setup routine for the data flow graph using the second set of parameter values.

14. The method as claimed in claim 1, further comprising deactivating the data flow graph by executing a graph deletion routine for the data flow graph, graph deletion comprising deleting the entries corresponding to each node in the node table, deleting the memory allocations corresponding to the nodes; and then deleting the graph entry from the node table.

15. The method as claimed in claim 12, further comprising implementing a control layer which operates to determine whether to execute the graph rebuild routine or a graph deletion routine in accordance with a predefined trigger mechanism.

16. The method as claimed in claim 15, wherein the method further comprises detecting a system performance requirement change, the system performance requirement change corresponding to at least one of sensor operations inside the data flow graph, probe operations inside the data flow graph, and external sensor data, and wherein the predefined trigger mechanism is based upon the detection of the system performance requirement change.

17. The method as claimed in claim 1, further comprising detecting a system performance requirement change, the system performance requirement change corresponding to at least one of sensor operations inside the data flow graph, probe operations inside the data flow graph and/or external sensor data.

18. A processing device for executing a digital signal processing algorithm, the processing device including:
a processor configured to:
call a graph setup routine for a dynamically adjustable data flow graph;
execute the called graph setup routine with a first set of parameter values, thereby instantiating the data flow graph, the instantiated data flow graph comprising a plurality of nodes connected by one or more arcs indicative of data passage between the plurality of nodes; and
when the graph setup routine is complete, call a graph execution routine for the data flow graph
wherein the processor is configured to execute the called graph setup routine by:
building a node table corresponding to the data flow graph, the node table comprising, for each node of the plurality of nodes:
a pointer to an executable function that is called when the node is executed; and
arc information associated with the node; and
allocating memory for each of the plurality of nodes; and
wherein the node table, via the arc information of each of the plurality of nodes, defines a respective single arc of the one or more arcs joining any two nodes of the plurality of nodes.

19. The processing device as claimed in claim 18, wherein the processor is further configured to retrieve the graph setup routine directly from conventional procedural code by pointer reference.

20. The processing device as claimed in claim 18, further comprising:
a memory which stores a graph library; and
wherein the processor is further configured to retrieve the graph setup routine from a corresponding address within the graph library.

* * * * *